(12) United States Patent
Johnston et al.

(10) Patent No.: US 10,438,401 B2
(45) Date of Patent: *Oct. 8, 2019

(54) CACHING IN MAP SYSTEMS FOR DISPLAYING PANORAMIC IMAGES

(71) Applicant: NINTENDO CO., LTD., Kyoto (JP)

(72) Inventors: Rory Johnston, Redmond, WA (US); Corey Birnbaum, Redmond, WA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,071

(22) Filed: Aug. 1, 2017

(65) Prior Publication Data

US 2018/0075644 A1 Mar. 15, 2018

Related U.S. Application Data

(63) Continuation of application No. 15/001,458, filed on Jan. 20, 2016, now Pat. No. 9,734,623, which is a continuation of application No. 14/096,888, filed on Dec. 4, 2013, now Pat. No. 9,245,373.

(60) Provisional application No. 61/733,369, filed on Dec. 4, 2012.

(51) Int. Cl.
| | |
|---|---|
| *G06T 15/20* | (2011.01) |
| *G06F 1/16* | (2006.01) |
| *G06F 3/01* | (2006.01) |
| *G06T 15/00* | (2011.01) |
| *H04N 5/225* | (2006.01) |
| *G06F 3/0346* | (2013.01) |

(Continued)

(52) U.S. Cl.
CPC .......... *G06T 15/205* (2013.01); *G06F 1/1694* (2013.01); *G06F 3/011* (2013.01); *G06F 3/0346* (2013.01); *G06F 3/0412* (2013.01); *G06T 3/0062* (2013.01); *G06T 15/005* (2013.01); *H04N 5/2259* (2013.01)

(58) Field of Classification Search
CPC .... G06T 3/0062; G06F 3/0346; H04N 5/2259
See application file for complete search history.

(56) References Cited

U.S. PATENT DOCUMENTS

| | | |
|---|---|---|
| 6,192,393 B1 | 2/2001 | Tarantino et al. |
| 6,278,432 B1 * | 8/2001 | Ratnakar ................ G06T 11/00 345/428 |
| 7,933,395 B1 | 4/2011 | Bailly et al. |

(Continued)

*Primary Examiner* — Samantha (Yuehan) Wang
(74) *Attorney, Agent, or Firm* — Nixon & Vanderhye, P.C.

(57) ABSTRACT

Operations for caching to display panoramic images include repeatedly receiving an indication of one or both of a current geographic location and a current view direction for a user, receiving from a remote server a first plurality of image tiles of a first panoramic image of a predicted geographic location, caching the received first plurality of image tiles, and processing the cached first plurality of image tiles. The processing includes decompressing the cached first plurality of image tiles and storing the decompressed image tiles. When the current geographic location is at the predicted geographic location, rendering, using the stored decompressed tiles, the first panoramic image to a plurality of three-dimensional surfaces in a memory, wherein each of the plurality of three-dimensional surfaces corresponds to a respective portion of a sphere.

22 Claims, 10 Drawing Sheets

(51) Int. Cl.
*G06F 3/041* (2006.01)
*G06T 3/00* (2006.01)

(56) References Cited

U.S. PATENT DOCUMENTS

| | | | |
|---|---|---|---|
| 8,537,003 B2 * | 9/2013 | Khachaturov | G08B 21/24 |
| | | | 340/540 |
| 8,681,151 B2 | 3/2014 | Coombe et al. | |
| 8,767,040 B2 | 7/2014 | Jones et al. | |
| 8,817,067 B1 | 8/2014 | Fan et al. | |
| 8,982,154 B2 * | 3/2015 | Vincent | G06T 17/05 |
| | | | 345/419 |
| 8,984,099 B1 | 3/2015 | Giencke et al. | |
| 9,245,373 B2 | 1/2016 | Johnston | |
| 2010/0215250 A1 * | 8/2010 | Zhu | G06T 17/05 |
| | | | 382/154 |
| 2011/0250962 A1 * | 10/2011 | Feiner | A63F 13/57 |
| | | | 463/31 |

* cited by examiner

CACHING IN MAP SYSTEMS FOR DISPLAYING PANORAMIC IMAGES

CROSS-REFERENCE TO RELATED APPLICATIONS

This application is a continuation of U.S. patent application Ser. No. 15/001,458 filed Jan. 20, 2016 (to issue Aug. 15, 2017 as U.S. Pat. No. 9,734,623), which is a continuation of U.S. patent application Ser. No. 14/096,888 filed Dec. 4, 2013, now U.S. Pat. No. 9,245,373 issued Jan. 26, 2016, which claims priority from provisional application No. 61/733,369, filed on Dec. 4, 2012, the contents of which are incorporated herein in their entireties.

BACKGROUND

Many conventional applications enable the use of geographic maps for exploring areas by viewing related photographic imagery and/or for navigation. Some of the image data associated with geographic locations in such applications can be very large due to the high resolutions used in acquiring them. Panoramic image data associated with such locations can be even larger. Such large images often negatively affect the user experience because substantial delays are caused when the images are downloaded to the display devices from remote servers, and further, delays may occur with local processing of the images.

DETAILED DESCRIPTION

Example embodiments described herein include a system, a method, and a medium on which a processing program is recorded. These embodiments will be described with reference to the accompanying drawings. It should be noted that the embodiments described below are illustrative, and are not intended to limit the disclosure to specific configurations described below.

The subject application, in some embodiments, describes systems and methods for providing intuitive and entertaining displays of map images, panoramic ("street-view") images and related information using an arrangement of two or more display devices (e.g., a television and a hand-holdable display device such as a tablet, a cell phone and the like). In some other embodiments, only a single display device, such as a mobile display device, is required.

Figure 1:
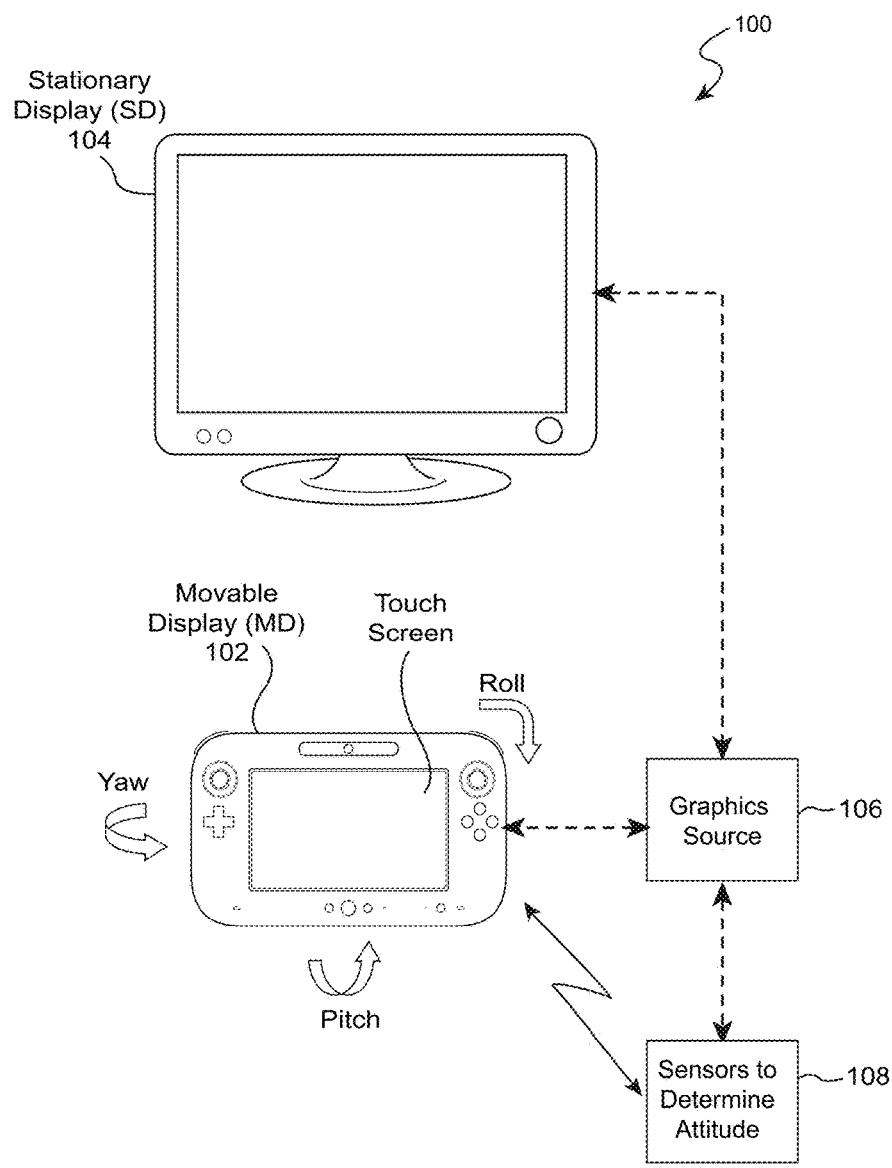
FIG. 1 illustrates a block diagram of a system according to an embodiment.

FIG. 1 shows an example non-limiting system 100 that provides a spatially-immersive interactive multi-display human-machine interface usable in connection with the systems and methods described herein. The example system 100 includes two display devices, one movable (e.g., hand-holdable) and one stationary. The movable display 102 in the example implementation is physically movable in free space during use, whereas the stationary display 104 is relatively physically stationary in space during use. Of course, stationary displays 104 such as home televisions can be moved from one place to another, but are generally not moved (or not moved much) during use. Thus, "stationary" does not necessarily mean absolute immobility, but can encompass displays that are not generally moved (or not moved much) during use. In other non-limiting implementations, the stationary display 104 can also be movable or partially movable.

The system 100 also includes one or more graphics source(s) 106 which control or enable display devices 104, 102 to display computer-generated or other images, including, but not limited to, the map images, panoramic ("street-view") images and related information described herein. Graphics source(s) 106 may include storage for storing information used to generate the various images described herein. Alternatively or in addition, graphics source(s) may be configured to access such storage (e.g., via the internet) using appropriate communication circuitry. For example, graphics source(s) may be configured to access a Google Maps database via the internet.

If display device 104 is stationary, its location and attitude in 3D space can be assumed and generally need not be measured. Sensors 108 measure the attitude or other aspect(s) of potentially-changing spatiality of movable display device 102, e.g. using MARG ("Magnetic Angular Rate Gravity") technology.

The graphics source(s) 106 are configured to be responsive to information from the sensors 108 to control the images displayed on one or both of display devices 104, 102. For example, the graphics source(s) 106 may include, or be in communication with, processing circuitry that receives information from the sensors 108 and that controls the displayed images based on the received sensor information.

Figure 2A:
FIG. 2A illustrates another system according to an embodiment.

In an example non-limiting implementation, the display devices 102 and/or 104 are used to display maps and panoramic street views corresponding to positions on the maps. With reference to FIG. 2A, in certain operations of the example implementation, display device 204a displays a map 201 and a current location on the map. The current location on map 201 is indicated by an animated character 203 who moves along the route either automatically or in response, for example, to inputs supplied to input devices associated with display device 202a. Display device 202a displays a panoramic view for the current location. The viewing direction of the panoramic view may be correlated with a direction in which the animated character 203 is facing. As the display device 202a is moved, the viewing direction of the panoramic view displayed on 202a changes and the display of the animated character is updated to reflect the new viewing direction. The panoramic views are changed in accordance with the progress of the animated character 203 along the route on the map 201. System 200 shown in FIG. 2A, also includes another information processing device 206a that may communicate with 202a and 204a. According to an embodiment, information processing device 206*a* includes a graphics source or is connected via a network (not shown) to a remote server (not shown) for obtaining the graphics (e.g. map graphics, panoramic images, etc.).

The processing required for obtaining panoramic imagery, preparing the panoramic imagery for display, displaying the panoramic imagery in accordance with user input, and displaying the map imagery as shown on 204*a* may be distributed among information processing device 206*a*, 204*a*, and 202*a*. According to an example embodiment, the acquiring of the images and forming a three-dimensional object model for the panoramic image is performed by the information processing device 206*a*, and the display of the three-dimensional model in accordance with user input is performed by movable display 202*a*. The animation of character 203 may also be determined by information processing device 206*a* and what is displayed on stationary display 204*a* may be updated accordingly.

According to an embodiment, information processing device 206*a* includes a separate frame buffer for each display device, such as movable display 202*a* and stationary display 204*a*. Information processing device 206*a*, in response to inputs received from one or more of movable display 202*a* and stationary display 204*a* renders respective imagery into the frame buffers of the separate display devices which are then displayed on the separate display devices. For example, information processing device 206*a* renders the panoramic image displayed on movable display 202*a* in one frame buffer while substantially simultaneously rendering the corresponding map and animated character displayed on stationary display 204*a* in another frame buffer.

Figure 2B:
FIG. 2B illustrates a movable display device and a stationary display device of a system in accordance with an embodiment.

With reference to FIG. 2B, in other operations of the example implementation, a map is displayed on movable display 202*b* and a corresponding panoramic view is displayed on stationary display 204*b*. The panoramic view on stationary display 204*b* corresponds to a map location selected, for example, using a stylus. When the map is displayed on display device 202*b*, a user can specify a route on the map using a stylus. For longer distance routes, a user can specify start and/or end points and graphics source(s) 206*b* can search for one or more routes between these points.

Figure 2C:
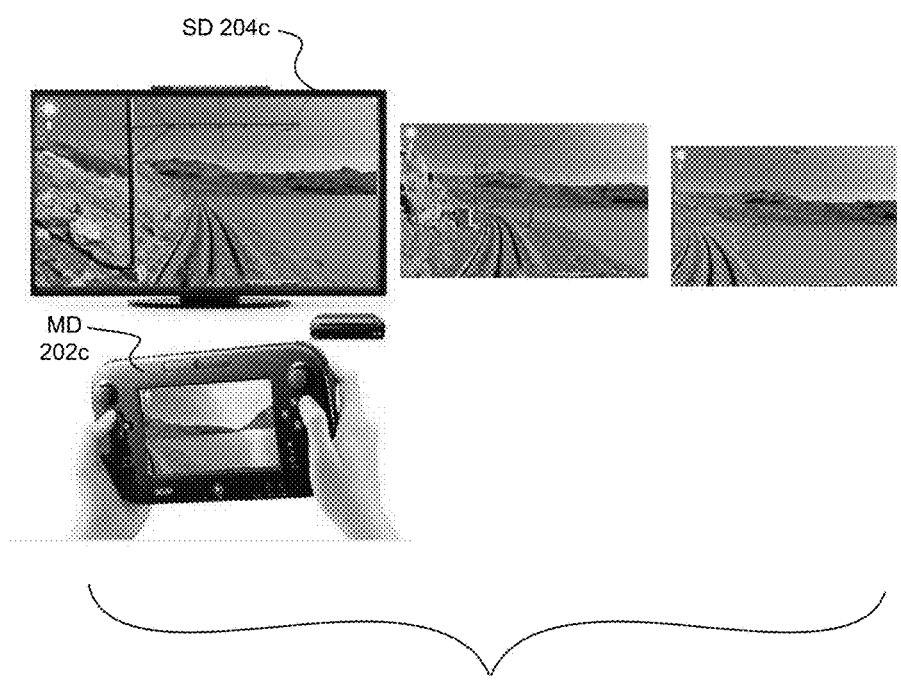
FIG. 2C illustrates another system according to an embodiment.

With reference to FIG. 2C, in still other operations of the example implementation, graphics source(s) 206*c* can automatically "playback" a specified route so that display device 204*c* displays panoramic views associated with traversing the route. Display device 202*c* may be used to view the route from viewpoints, view directions, etc. other than those associated with the display device 204*c*. Thus, a user may look to the left, to the right, up, down, etc. using display device 202*c* as the route is traversed, while the display device 204*c* continues to display images of the route from the same viewpoint, view direction, etc.

In this example implementation, stationary display (e.g., 204*a*) is physically stationary in the room (e.g., living room, family room) where it is located. It can for example be a relatively large fixed display (e.g., a wall or table mounted television or other display) used to present an image of a 2D or 3D map. The images that stationary display displays can be static or dynamic. For example, they may include a map (e.g. 201) having one or more highlighted routes and one or more animated characters. The map may scroll as the animated character(s) (e.g., 203) reach the boundaries thereof. The map images may dynamically change in other ways including viewpoint, e.g., in response to user input or other factors.

In the example implementation, movable display (e.g., 202*a*) is movable in free space and displays, for example, a panoramic view corresponding to a location currently highlighted on the map. The attitude of the movable display can be used to vary the panoramic view on the movable display by changing the viewpoint, viewing perspective, viewing direction, field of view, image orientation, augmentation, scale and/or other image characteristic(s).

A human can move movable display anywhere in free space. Moving an object anywhere in free space is sometimes called moving in "six degrees of freedom" (6DOF) because there are generally six basic ways an object can move. For example, the person can move ("translate") movable display along any of three orthogonal axes: up and down (vertical or "y"), left and right (horizontal or "x"), and forward and backward (depth or "z"). The person can rotate movable display about any of three orthogonal rotational axes (pitch, yaw and roll). Just like any object, the person can simultaneously move movable display in any combination of these "six degrees of freedom" to move movable display in any direction and manner in three-dimensional space. For example, the person can spin movable display about the roll (and/or any other) rotational axis at the same time she translates the device down or in any other direction(s)—like an airplane that rolls and descends at the same time, for example.

In the example implementation, system 100 has sensors 108 that detect aspects of the spatiality of movable display such as its attitude. These sensors may include one or more of accelerometers, gyrosensors, magnetometers, ultrasonic transducers, cameras, and the like. These sensors enable movable display device to display panoramic views from different viewpoints, viewing perspectives, viewing directions or other characteristics responsive to aspects of the movable display's current spatiality.

In one non-limiting example, the person can move movable display device to new attitudes that permit the person to examine different parts of the current location indicated on map 201. For example, to look upward, the person can move or rotate movable display device upward. One or more of the sensors 108 detect this upward movement such as translation and/or rotation, and the graphics source(s) 106 are responsive to the upward movement detection to display an upward panoramic view on the movable display device 102. At the same time, the graphics source(s) 106 may update the display of the animated character on the stationary display device 104 so that the character's head faces upward, thereby effectively providing a view on stationary display device that a person can intuitively use as a reference or context to understand that the movable display device 102 is showing an upward panoramic view of the current location and as a reference or context for further movement or rotation of movable display device 102 to look at other parts of the current location.

Example movable display device 102 has a touch screen that can be controlled by touching it with a stylus or a finger. The touch screen can be used to provide various inputs including handwriting, gestures, etc.

Sensors 108 determine the attitude of movable display device 102. Sensors 108 may be contained within movable display device 102, placed outside of movable display device 102, or some sensors may be disposed within movable display device 102 and other sensors may be disposed externally to movable display device. More detail concerning example non-limiting arrangements for sensors 108 may be found in U.S. patent application Ser. Nos. 13/019,924 and 13/019,928, filed on Feb. 2, 2011, and U.S. patent application Ser. No. 13/153,106, filed on Jun. 3, 2011, the contents of which are incorporated herein by reference in their entirety. In other implementations, sensors 108 shown in FIG. 1 may include any desired sensor(s) such as mechanical, acoustic, ultrasonic, camera, optical, infrared, magnetic, electromagnetic (e.g., radio or microwave), inertial, gyroscopic, acceleration-based, fiducial-based, outside-looking-in, inside-looking-out, GPS, cell phone, and/or any combination thereof.

Figure 3:
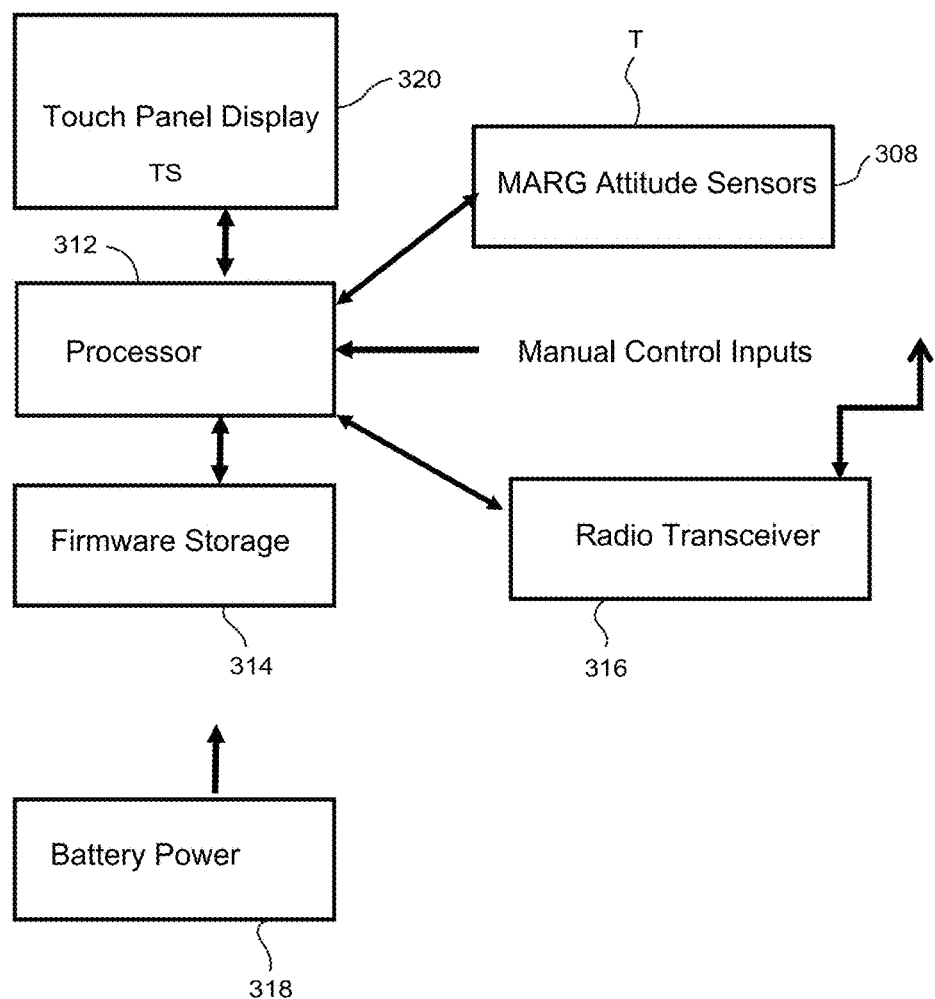
FIG. 3 illustrates a block diagram of a display device in accordance with an embodiment.

FIG. 3 shows an example non-limiting block diagram of movable display 102 (for more details see U.S. patent application Ser. Nos. 13/019,924 and 13/019,928 filed on Feb. 2, 2011, and U.S. patent application Ser. No. 13/153,106, filed on Jun. 3, 2011, the contents of which are incorporated herein by reference in their entirety). Manual control inputs from the manual controls detailed above are supplied to processor 312. The processor may harvest data inputs (including from touch panel display 320) and report them via a radio transceiver 316 or other wireless or wired connection to a remote console or computer (e.g., 206a) for analysis. The remote console or computer (which may also be connected to stationary display wirelessly or by wire) may process the reported data inputs and generate compressed or other images that it may send to the movable display radio transceiver 316. The movable display device processor 312 may decompress the received images and display them on touch panel display 320.

The remote console or computer 106 can be one or more graphics generators located in one place or distributed in a variety of places communicating via one or more networks. Such graphics generator(s) can use conventional 3D graphics transformations, virtual camera and other techniques to provide appropriately spatially-coherent or other images for display by the movable display or the stationary display. For example, the graphics generator or computer 106 can be any of:

- a graphics generator that is part of or is a separate component co-located with stationary display and communicates remotely (e.g., wirelessly) with the movable display; or
- a graphics generator that is part of or is a separate component co-located with movable display and communicates remotely (e.g., wirelessly) with the stationary display or associated equipment; or
- a distributed graphics generating arrangement some of which is contained within the movable display housing and some of which is co-located with the stationary display, the distributed portions communicating together via a connection such as a wireless or wired network; or
- a graphics generator located remotely (e.g., in the cloud) from both the stationary and movable displays, and communicating with each of them via one or more network connections; or
- any combination or variation of the above.

In the case of a distributed graphics generator architecture or arrangement, appropriate data exchange and transmission protocols are used to provide low latency and maintain interactivity, as will be understood by those skilled in the art.

In one particular example, the MARG attitude sensors 308 (i.e., a triaxial accelerometer, a triaxial gyroscope and a tri-axial magnetometer) provide sensor outputs to a processor 312 that executes instructions stored in non-transitory firmware storage 314. An example non-limiting method uses the 3-axis gyroscope (Angular Rate) with error correction by using 3-axis accelerometer based Gravity vector reference (for roll and pitch), and 3-axis Magnetometer based north vector reference (for yaw). This so called orientation or attitude measurement is by "Magnetic Angular Rate Gravity (MARG)". In the example shown, the MARG sensors T are not capable of detecting absolute position and use a magnetometer to detect what can be thought of as something like magnetic compass heading relative to the earth's magnetic field.

An initial calibration step can be used to allow system 100 to establish and maintain attitudinal spatial coherence between the two displays stationary display 104 and movable display 102. In such case, the person may be asked to orient the movable display 102 in a certain way relative to the stationary display 104 to calibrate the system so that the magnetic compass bearing (e.g., NNW or 337.5°) of stationary display 104 within the room or other environment is known. Calibration of movable display 102 is possible in a general free space (3D) orientation, or transformation (movement) case (note that some special usage like 2D or linear orientation or movement as the subset of free space usage would also be possible). There, the example non-limiting implementation relies on the relative movement of the movable display 104 with initial calibration.

To calibrate during setup, the person may hold the screen of movable display 102 parallel to the stationary display 104 while generally aiming a perpendicular vector at the center of the stationary display. A button or other user control may be pushed. The system 100 will measure and store the magnetic field in the room to determine the orientation that the movable display 102 is in when the user says it is pointing at the stationary display 104.

Figure 4:
FIG. 4 illustrates a panoramic image in accordance with an embodiment.

As noted above, graphics source(s) or computer 106 may access a Google Maps database via the internet. The panoramic ("street-view") image from this database is in the format of an image whose width is twice its height, as shown in FIG. 4.

The panoramic image can have a very large resolution. On certain hardware, however, images having more than a certain number of pixels cannot be rendered at all, and in certain other instances cannot be rendered efficiently. For example, some hardware may be incapable of processing image tiles greater that 8192 pixels, due to limitations in graphics texturing capabilities. Memory limitations may also restrict the capacity to handle large images and the efficiency with which images are processed.

Due to size constraints of the original source data (e.g., Google), all of these images are split into equal size tiles. Also, the image itself has various levels of detail, each one being half the width and height of the previous level of detail. For example, if the highest zoom level is N×M pixels, the next zoom level would be N/2×M/2 pixels. Each image (e.g., panoramic image) generally has a final width and height divisible by the tile size. See, for example, FIG. 5.

Figure 5:
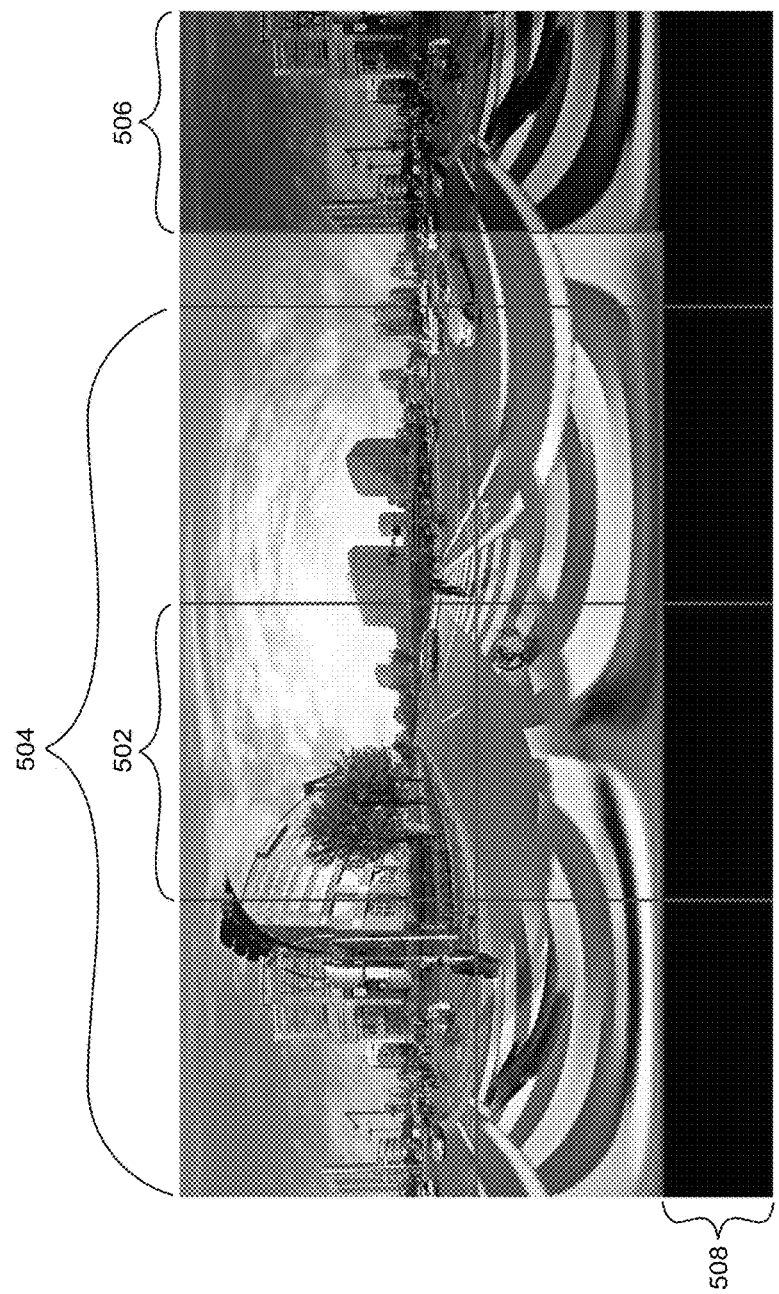
FIG. 5 illustrates a panoramic image as represented by a plurality of image tiles in accordance with an embodiment.

In FIG. 5, the final panoramic spherical image is split into 4×2 equal size tiles (see, e.g., tile 502), which, when combined, are greater than the actual image to be used for spherical display. For example, the actual panoramic image 504 is smaller than the combined image of all the tiles which adds padding areas 506 and 508 to the image 504.

It is desirable then to generate polygon "patches" or sub meshes that will each correspond to a tile, or part of a tile, that makes up the final image, and when those sub meshes are placed in their appropriate positions, the final sphere geometry is created.

Figure 6:
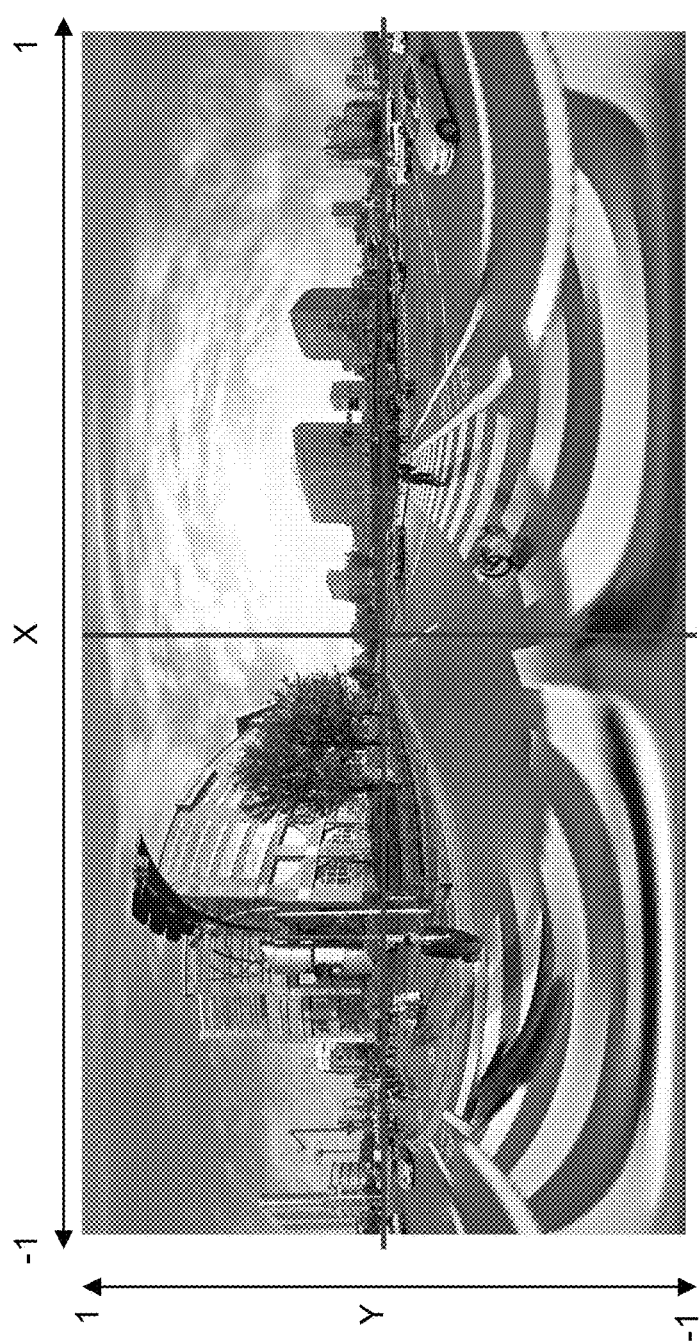
FIG. 6 illustrates a panoramic image as it would be mapped to a sphere, in accordance with an embodiment.

To determine how to generate each patch, a determination is made of how the image is designed to map to the sphere. Using the image without padding, that mapping is (assuming a unit sphere with a radius of 1) shown in FIG. 6.

So for each tile in the final texture, a series of polygons is generated based on its intended location within what normally would be a single image. The number of polygons is based on the number of a maximum number (e.g., 5,000) divided by the number of tiles, with a minimum of 8 triangles per sub mesh. Each point of the sub mesh is a curved piece of a sphere, and due to the way the texture map is generated, sub meshes for tiles at the north and south poles of the sphere have a higher spatial concentration of points than those at the equator. This relative concentration of points at the north and south poles of the sphere can be seen in FIG. 6 at Y=1 and Y=−1.

Due to the fact that the sub tiles of the final image that makes up a sphere view may each be transferred over the internet, it can take substantial time before they all arrive. Consequently, it is desirable to be able to prepare adjacent panoramic ("street view") images in memory before they are required for drawing, and also retain where the user's viewpoint was previously so a quick return to that point can be made without reloads.

An example method along these lines includes:

(1) Allocate a fixed amount of memory for the caching, with a maximum number of possible cached images (for example, 200 MB of RAM for up to 500 images).
(2) When a compressed (for example, JPEG) image is received, its compressed data and name are sent as a request to be cached.
(3) The caching system determines the amount of memory necessary to store the compressed JPEG image and uncompressed image data in the native hardware texture format.
(4) It will attempt to allocate that memory from the fixed cache as well as use one of the possible image data (500 in the previous example) structures.
(5) If there is insufficient free space in the cache, the oldest images are removed from the cache until enough memory is available to allocate it.
(6) Images are added in order so that the oldest image is always the first in the list, and the newest is always the last. Each image is given a unique ID value. Each image can optionally have a group ID assigned to it.
(7) A background processing thread moves through the list of images sequentially and decompresses them. If an image is being decompressed when the cache attempts to free it in step 5), decompression automatically stops.
(8) When an image finishes being decompressed, it is converted to a native hardware texture format and the cache is notified that it is available to be used for drawing.
(9) Drawing with a texture always makes it a "new" texture, automatically pushed to the end of the cache so it is the last to be freed when there is no memory for a new image.
(10) When an attempt to use a texture for drawing is made, the texture is checked to see if its unique ID is still the same as the last time it was drawn; if the value has changed, the cache has reallocated that image, the drawing fails, and a notification is sent that the image is no longer cached.
(11) A check may be made to determine if a single image is decompressed, or if all images with a specific Group ID are finished being decompressed. This may be used when it needs to be determined if all the tiles related to a final panoramic ("street view") image are decompressed so they can be drawn.

Figure 7:
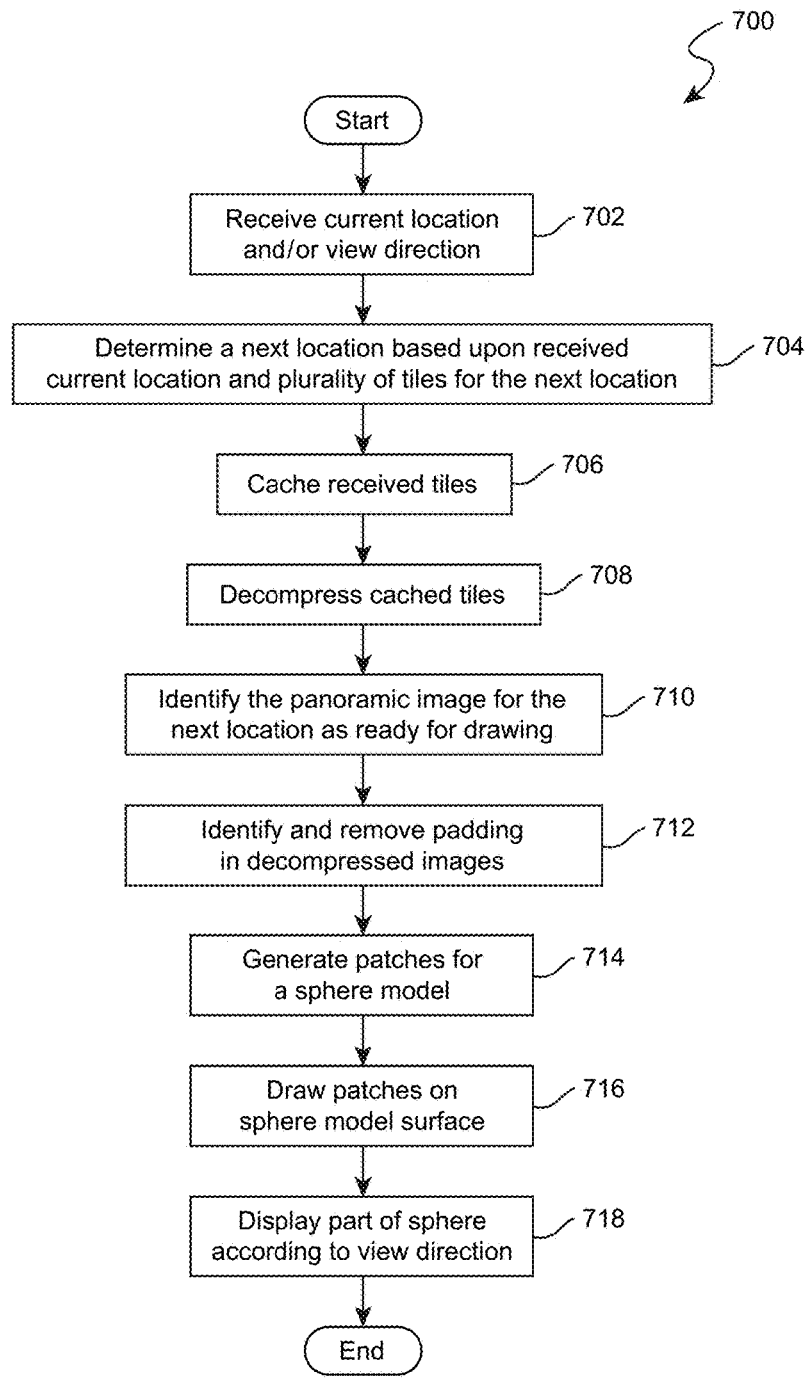
FIG. 7 illustrates a flowchart of a method for displaying panoramic images in accordance with an embodiment.

FIG. 7 illustrates a flowchart of an example method 700 in accordance with one or more embodiments. Method 700 may be performed, for example, when a user, using a system as shown in FIG. 2A, engages in exploring images that correspond to locations indicated on a geographic map. The user may, as shown in FIG. 2A, use a movable display device to view panoramic imagery of certain geographic locations. The geographic locations of which panoramic imagery is being viewed may be selected and/or otherwise indicated on a map displayed on the movable display device and/or on a stationary display device as shown in FIG. 2A. An information processing device, such as graphics source G shown in FIG. 1 or information processing device 206a shown in FIG. 2A, is communicably connected to the movable display device (e.g., 202a) and to the stationary display device (e.g., 204a). In an embodiment, the movable display device is connected wirelessly, and the stationary display device is connected by wire.

The user may indicate the current geographic location being explored by controlling an object, such as animated character 203, to move about on a portion of a map displayed on stationary display device. The movements of the object on the map may be responsive to user input provided by pressing a key, pressing a button, moving a joystick, mouse input, touch input on a touchpad, or other input. The user may also indicate the view direction by controlling the object on the map, for example, by controlling the direction in which animated character is turned. The input for changing the view direction may be provided by using key, button, joystick, mouse, or touch input to change a direction in which the object on the map is facing. The view direction may also be changed by changing the orientation of the movable display device, for example, by controlling the yaw, pitch and/or roll of movable display device. The image viewed on the movable display device is changed in accordance with the user's current geographic location and the current view direction. The image viewed on the movable display device may, in some embodiments, may be a panoramic image or a portion thereof of the current geographic location displayed according to the current view direction.

Although method 700 is illustrated with operations 702-718, it will be appreciated that one or more operations 702-718 may be omitted, combined and/or performed in an order different from that shown below.

At operation 702, the information processing device receives indications of one or more of (1) the current geographic location being viewed by the user, and (2) the current view direction of the user.

The current geographic location may be obtained based upon aspects of position and/or orientation of movable display device 202a. For example, after an initial position with respect to a geographic map has been indicated by the user (e.g., position on the map 201 of animated character 203), the relative movements of movable display device 202a may be tracked in order to obtain changes in the current position of the user. In some embodiments, after his initial position with respect to a geographic map has been selected by the user, directional input may be provided using movable display device 202a in order to indicate the user moving along a street or the like.

According to yet other embodiments, the current geographic location for panoramic imagery may be indicated by an input provided by the user using a map displayed on movable display device 202b (e.g., as shown in FIG. 2B), or by an input provided by the user upon a map displayed on stationary display device 204a (e.g., as shown in FIG. 2A, by controlling the position of the character).

The current view direction may be indicated by the orientation of movable display device 202a, as determined using sensors. According to another embodiment, the current view direction may be indicated by the user controlling an object (e g, animated character 203 shown in FIG. 2A) to explicitly indicate the view direction of interest. In yet another embodiment, the current view direction may be indicated by button and/or cursor input provided through movable display device 202*a*.

At operation 704, the system determines a location adjacent to the current geographic location as indicated by the user as a next location (e.g. a predicted location) along the user's path. For example, the location closest to the current location and for which panoramic imagery is available may be selected as the predicted location. The predicted location may be determined based on map information and/or image availability information provided by a remote server, or based upon a pre-configured information.

Having identified a next location, panoramic imagery for that location is obtained. The panoramic image corresponding to the next location is received in the form of a plurality of image tiles. Control information, provided separately or via header information of at least some of the image tiles, indicates the number of image tiles that make up the entire panoramic image, the resolution of the panoramic image, etc. The receiving of the image tiles may be in response to a request from the information processing device sent to the remote server. In some embodiments, the image tiles may be available from a local image source.

At operation 706, when an image tile of the panoramic image of the predicted location is received, that image tile is cached. The cache of image tiles may be ordered in accordance with the time of receipt, with each newly received image tile added to the end of the cache.

The cache may be configured for a fixed size of memory.

If the cache does not have sufficient space for the latest received image tile (i.e. cache is full), then one or more image tiles that are in the cache are evicted to make space for the newly received image tile. According to an embodiment, the oldest cached image tiles are first evicted in order to make space for the new tiles. Use of other cache eviction schemes, or cache replacement schemes, are possible and are encompassed within the scope of this disclosure.

It should be noted that the cached image tiles may all not be of the same size, for example, because for some panoramic images, image tiles of different resolutions may be received. Therefore, in some instances, two or more already cached image tiles may be evicted in order that the new image tile is added.

At operation 708, cached image tiles are decompressed. According to an embodiment, one or more background threads traverse the cache decompressing the respective image tiles. Image tiles may be decompressed sequentially in order of oldest cached image tile to the newest. Other ordering of the tiles selected for decompression, such as, for example, decompressing all the image tiles of a particular panoramic image in one sequence may be implemented in some embodiments.

It will be appreciated that the image tiles received from a remote server are, in general, highly compressed. Decompressing the image tiles may be a part of the processing of each tile before they are ready to be used in drawing. According to an embodiment, after an image tile received from the remote server in a JPEG format is decompressed, it is converted to a native hardware texture format of a device on which the panoramic image is to be displayed. An example native hardware format to which the compressed JPEG images are converted may be an RGB format.

The decompressed image tile, which is now in a native hardware format, is stored in memory in association with the corresponding cached tile. For example, the decompressed image of a particular cached tile will be stored in a separate area of a dynamic memory such that it can be found when the corresponding cache image tile is accessed. One or more pointers may be set from the cached image tile to the corresponding decompressed image in native hardware texture.

According to another example embodiment, the decompressed images may be stored in a pre-allocated data structures. For example, one or more data structures may be pre-allocated for holding the respective decompressed image tiles for an entire panoramic image or part thereof, and the one or more data structures may be updated with image tiles corresponding to the latest next panoramic image being formed.

According to some embodiments, the decompressing of cached tiles corresponding to a particular next location is commenced only upon an indication that the user is moving in the direction of that particular next location. For example, when a user (for example, during his traversal of a map using movable display device 201*a* and animated character 203) arrives at a four-way intersection and pauses, the panoramic imagery corresponding to that four-way intersection is displayed. Also, a next location on each of the four possible paths may be identified, and their image tiles may be obtained and cached. The image tiles of the four possible next locations are not decompressed until the user indicates further movement (e.g., starts walking). When further movement is detected along one of the four possible paths from the intersection, the image tiles corresponding to the selected path are decompressed. In this mariner, decompression of the relevant panoramic image can be completed before the user arrives at the corresponding next location while not unnecessarily decompressing other panoramic images that may not be viewed by the user.

At operation 710, it is identified that decompression has completed for all image tiles that make up the panoramic image of the predicted location. The panoramic image for the predicted location is indicated as being ready for drawing. For example, a flag may be set in memory indicating that the corresponding group of image tiles is ready.

The identification that all image tiles corresponding to a panoramic image, for example, such as, the next panoramic image to be displayed, have completed decompressing may be based upon a group identifier. For example, all image tiles of the next panoramic image to be drawn have the same group identifier. The group identifier may be assigned upon receipt of each respective tile. As each tile completes decompressing, a parameter associated with the corresponding group identifier can be updated indicating that one of the corresponding tiles have completed decompressing.

At operation 712, padding included in the received image tiles is identified and removed. As described above in relation to FIGS. 4 and 5, the remote server may include padding in some of the image tiles such that all the image tiles for a selected panoramic image at a particular resolution are the same size. The padding may comprise a part of the panoramic image that is already included in one or more other tiles, or may include data that is not part from the actual image.

From control information received along with the image tiles, the resolution of the actual panoramic image (excluding the padded areas) can be determined. The control information may be received from the remote server either separately or together with at least some of the image tiles. According to some embodiments, the control information is included in the headers of one or more of the image tiles.

The control information also indicates how many image tiles make up the panoramic image. In some embodiments, the number of image tiles for the panoramic image may be determined based upon the number of image tiles received. Based upon the number of image tiles received and the size of each tile, the size of the entire image made by the received tiles including the padding can be determined.

The control information provides a horizontal resolution and a vertical resolution of the actual panoramic image excluding the areas of padding.

The difference between the total size of the image and the size of the actual panoramic image is the padding. According to an embodiment, padding is included in the received tiles such that, tiles in the right-most column and the tiles in the lowest row have padding included. An example is shown in FIG. 5. The top-left edge of the actual panoramic image is flush with the top-left edge of the larger image formed by arranging the received image tiles. Based upon the above, the horizontal and vertical padding areas can be separately identified.

The identified padding is then removed from the decompressed images. Thus, according to an example embodiment, the decompressed image tiles do not have any padding, and therefore, such tiles may not all be of the same size.

At operation 714, patches are generated. A patch maps at least a portion of an image tile to an area on the surface of a three-dimensional sphere model. Each patch may be a separate object corresponding to a respective portion of the sphere model. According to an embodiment, one patch is created for each image tile.

A patch includes a plurality of polygonal shapes, such as, for example, triangles, that each map to a respective non-overlapping area of the three-dimensional sphere. Forming the patch using smaller polygons enables accurately representing the curved surface of a sphere. The number of triangles for each patch is determined based upon several factors including a maximum total number of triangles that can be drawn on a particular display device, and a configured minimum number of triangles per patch. Each patch is created so that the imagery contained within that patch is aligned along the seams with the imagery in adjoining patches.

In order to generate each patch corresponding to a tile, the geographic location of each corner of the tiles is determined based upon the panoramic image. The determined locations are then mapped to positions of the sphere, and the patch is mapped and/or positioned accordingly.

At operation 716, patches are drawn to form the three-dimensional model of the panoramic image. A patch can be drawn by rendering the respective triangles which make up the patch. By drawing the portions of the panoramic image corresponding to respective patches, and by positioning the patches in accordance with their respective positions in a sphere, a three-dimensional sphere model is formed which can be used to present a complete 360-degree view from a particular view direction. According to an embodiment, the three-dimensional sphere model presents 360-degree view from a location corresponding to the viewpoint at the center of the sphere.

Upon drawing a patch, optionally, the cached image tile corresponding to the drawn patch, can be removed from its current position in the cache, and re-inserted to the cache as a later image tile. The re-insertion may be immediate. Such re-insertion of the corresponding image tile as a newly received image tile, allows that tile remain in the cache for a longer time thereby facilitating speedy rendering of the panoramic image when the user views different angles of the same panoramic image, or when the user later returns to the same panoramic image after having proceeded to another one or more panoramic images.

According to an example embodiment, the initiation of the drawing of a texture of a panoramic image onto the three-dimensional sphere model is initiated when the user's current geographical position changes. Upon such a change, the system first attempts to obtain an available panoramic image for the current geographic position from the cache. This check may be performed for each tile of the panoramic image, and may be based upon checking a corresponding unique id for each tile or a corresponding image id or group id for the panoramic image. If the image, or one or more of the tiles are not in the cache at the time they are needed for the drawings, then such missing components are requested from the remote server.

At operation 718, at least a portion of the three-dimensional sphere model is displayed on a display screen. The display of the panoramic image from the three-dimensional sphere model is initiated when the current geographic location is the same as the predicted location, for example, as would occur when the user (e g animated character 203 controlled by the user) walks from a previous location to the predicted location.

According to an embodiment, the three-dimensional sphere model with the panoramic image drawn upon it is provided to a three-dimensional rendering unit, which can track changes in the user's view direction (e.g. orientation), and accordingly display a corresponding portion from the sphere model. According to another embodiment, the corresponding patches may be drawn to the sphere model when the user's viewpoint changes to a particular area and then displayed.

In some embodiments, concurrently with displaying the panoramic image on a first display device, a corresponding map image (see FIG. 2A) may be rendered for, and displayed on, a second display device.

Figure 8:
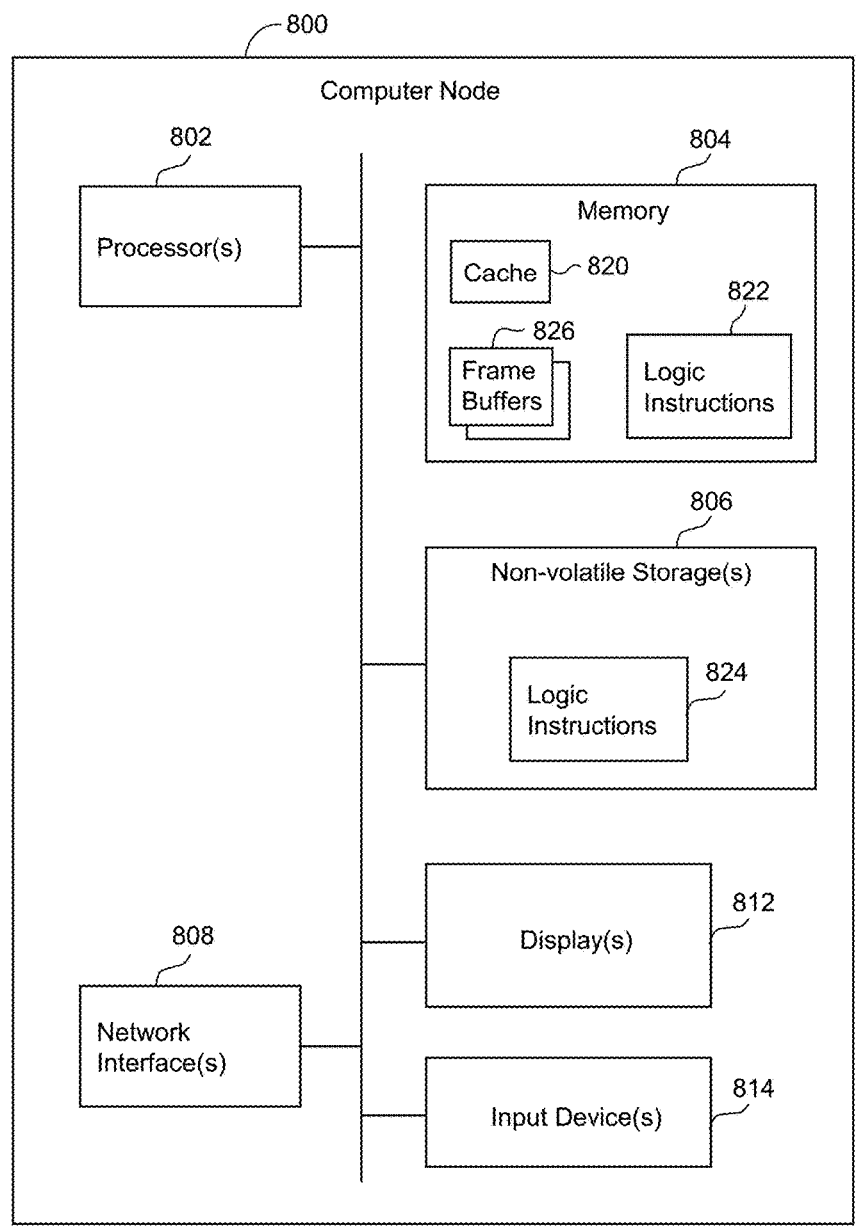
FIG. 8 is a block diagram of an example computer that can be used in one or more embodiments.

FIG. 8 shows a computer node 800 used in one or more embodiments. For example, information processing device 206a may include computer node 800.

Computer node 800 includes at least one processor 802, at least one memory 804, at least one non-volatile storage 806, and one or more network interfaces 808, which are communicatively coupled by communication bus 810. One or more input devices 814 may also be directly or indirectly attached to computer node 800. Moreover, one or more displays 812 may also be directly or indirectly attached to computer node 800. Processor 802 can include any computer processor capable of executing a sequence of program or logic instructions. Logic instructions corresponding to a computer program may reside as logic instructions 824 in non-volatile storage and/or as logic instructions 822 in memory 804, and may be executed by processor 802. According to some embodiments, one or more operations 702-718 may be executed by processor 802 when computer node 800 is used as user information processing device 206a.

Memory 804 may include any type of volatile memory for storing instructions or data. Memory 804 may include an area for a cache 820. In some embodiments, cache 820 and other volatile memory 804 may be configured as separate areas, with the cache 820 being configured for fast access by processor 802. Memory 804 may also include one or more frame buffers 826. Frame buffers 826 may be used for rendering imagery for display on devices directly connected to computer 800 or on devices connected via a network.

Non-volatile storage 806 includes hard disk, non-volatile solid state memory devices, and like computer readable memory devices.

Display 812 may include any kind of display such as, for example, display devices capable of graphical display. Input devices 814 may include any input device, such as, keyboard, mouse, touch screen, microphone etc., that can provide input to a program executing on computer node 800.

Network interfaces 808 may include any type of network interface which enables computer node 800 to communicate through a network. Example networks accessed by computer 800 may include the Internet, cloud network, a corporate wide area or local area network, a WIFI network, and the like.

Hardware implementation of the described embodiments may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

While the technology herein has been described in connection with exemplary illustrative non-limiting embodiments, the invention is not to be limited by the disclosure. For example, given the conceptual nature of the present disclosure and its detailed exploration of a variety of different possible implementations, many statements herein do not correspond to any particular actual product that may be eventually be made available to consumers. Additionally, while the preferred embodiments use a stationary display and a movable display, both displays could be movable or both could be stationary, or there could be more displays some of which are movable and some of which are stationary. One or both the displays stationary display device and movable display device may a 3D display (e.g., an autostereoscopic display) that provide stereoscopic perception of depth to a viewer. One or both of the displays stationary display device and movable display device may be so-called high-definition displays (e.g., 1,280×720 pixels (720p) or 1,920×1,080 pixels (1080i/1080p)). Still additionally, the images displayed on the displays stationary display device and movable display device may be from any source such as an animation engine, a video game machine, a simulator, or a video which is appropriately transformed or processed to provide displays from different perspectives. The invention is intended to be defined by the claims and to cover all corresponding and equivalent arrangements whether or not specific.

What is claimed is:

1. A computer system, comprising:
    a handheld display device;
    a memory;
    an attitude sensor configured to detect an orientation of the handheld display device; and
    a processing system including at least one processor, wherein the processing system is configured to perform operations comprising:
        receiving an indication of a current geographic location;
        repeatedly obtaining an indication of an orientation of the handheld display device as provided by the attitude sensor;
        receiving a plurality of image tiles of a panoramic image corresponding to a predicted geographic location located in proximity to the current geographic location; and
        when the indication of the current geographic location is within the predicted geographic location, rendering a map image and the panoramic image to display a portion of the panoramic image according to the indication of the orientation provided by the attitude sensor and an aspect of the map image according to the current geographic location, the portion of the panoramic image being displayed on the handheld display device,
        wherein the map image and the panoramic image are displayed on respective display devices, wherein a first display device including the attitude sensor displays the panoramic image and a second display device displays the map image, and wherein a change in orientation of the first device causes a change in orientation of an animated object in the map image.

2. The computer system according to claim 1, wherein the predicted geographic location is determined based upon user input.

3. The computer system according to claim 1, wherein the predicted geographic location is determined based upon availability of panoramic imagery for the predicted geographic location and proximity of the predicted geographic location to the current geographic location.

4. The computer system according to claim 1, further comprising:
    caching the received plurality of image tiles; and
    using the cached image tiles, rendering at least a portion of the panoramic image to a sphere in the memory before said displaying the portion of the panoramic image according to the indication of the orientation.

5. The computer system according to claim 4, further comprising:
    receiving and caching image tiles for panoramic images of one or more other predicted geographic locations that are in proximity to the current location; and
    decompressing cached image tiles of said predicted geographic location when the current location changes.

6. The computer system according to claim 5, further comprising:
    receiving an indication of the current location change in a direction of the predicted geographic location; and
    decompressing, in response to the received indication of the current location changing in the direction of the predicted geographic location, cached image tiles of the panoramic image of only the predicted geographic location.

7. The computer system according to claim 4, further comprising:
    decompressing said cached image tiles; and
    storing each decompressed tile in the memory in association with a corresponding one of the cached image tiles.

8. The computer system according to claim 7, wherein the decompressing is started in response to the current location changing in a direction of the predicted geographic location.

9. The computer system according to claim 8, wherein the decompressing is completed before the current geographic location corresponds to the predicted geographic location.

10. The computer system according to claim 1, wherein the attitude sensor comprises an accelerometer and a gyroscope, and the displaying includes changing the displayed portion in accordance with six degrees of freedom of the orientation of a display determined based upon signals from the accelerometer and the gyroscope.

11. The computer system according to claim 10, wherein the attitude sensor further comprises a magnetometer, and wherein the orientation of the display is further determined based upon a signal from the magnetometer.

12. The computer system according to claim 11, wherein the display includes a touchscreen, and wherein the indication of the current geographic location is based at least in part upon a touch input detected by the touchscreen.

13. A method comprising:
receiving, by at least one processor, an indication of a current geographic location;
repeatedly obtaining, by the at least one processor, an indication of an orientation of a handheld display device as provided by an attitude sensor of the handheld display device;
receiving, by the at least one processor via a network interface, a plurality of image tiles of a panoramic image corresponding to a predicted geographic location located in proximity to the current geographic location; and
when the indication of the current geographic location is within the predicted geographic location, rendering, using the at least one processor, a map image and the panoramic image to display a portion of the panoramic image according to the indication of the orientation provided by the attitude sensor and an aspect of the map image according to the current geographic location, wherein the portion of the panoramic image is displayed on the handheld display device,
wherein the map image and the panoramic image are displayed on respective display devices, wherein a first display device including the attitude sensor displays the panoramic image and a second display device displays the map image, and wherein a change in orientation of the first device causes a change in orientation of an animated object in the map image.

14. A non-transitory computer-readable storage medium having instructions stored thereon, which when executed by a processor of a computer of a handheld electronic device including a memory, a display device and an attitude sensor configured to detect an orientation of the handheld display device, causes the computer to perform operations comprising:
receiving an indication of a current geographic location;
repeatedly obtaining an indication of an orientation of the handheld display device as provided by the attitude sensor;
receiving a plurality of image tiles of a panoramic image corresponding to a predicted geographic location located in proximity to the current geographic location; and
when the indication of the current geographic location is within the predicted geographic location, rendering a map image and the panoramic image to display a portion of the panoramic image according to the indication of the orientation provided by the attitude sensor and an aspect of the map image according to the current geographic location, wherein the portion of the panoramic image is displayed on the handheld display device,
wherein the map image and the panoramic image are displayed on respective display devices, wherein a first display device including the attitude sensor displays the panoramic image and a second display device displays the map image, and wherein a change in orientation of the first device causes a change in orientation of an animated object in the map image.

15. A computer system, comprising:
a memory;
an attitude sensor; and
a processing system including at least one processor, wherein the processing system is configured to perform operations comprising:
receiving, at each of a plurality of times during a time period, an indication of a respectively different geographic location along a route as a current geographic location;
repeatedly obtaining an indication of an orientation provided by the attitude sensor;
during the time period, when the current geographic location along the route is determined to be in proximity to but not within a predicted geographic location, receiving a plurality of image tiles of a panoramic image corresponding to the predicted geographic location and caching the received image tiles;
decompressing the cached image tiles, wherein said decompressing is started in response to the current location changing in a direction of the predicted geographic location; and
in response to the indication of the current geographic location is within the predicted geographic location, rendering a map image and the panoramic image to display a portion of the panoramic image according to the indication of the orientation provided by the attitude sensor and an aspect of the map image according to the current geographic location, wherein the panoramic image is rendered from the decompressed image tiles.

16. The computer system according to claim 15, wherein the predicted geographic location is determined based upon user input.

17. The computer system according to claim 15, wherein the predicted geographic location is determined based upon availability of panoramic imagery for the predicted geographic location and proximity of the predicted geographic location to the current geographic location.

18. The computer system according to claim 15, wherein the attitude sensor comprises an accelerometer and a gyroscope, and the displaying includes changing the displayed portion in accordance with six degrees of freedom of the orientation of a display determined based upon signals from the accelerometer and the gyroscope.

19. A method, comprising:
receiving, by at least one processor at each of a plurality of times during a time period, an indication of a respectively different geographic location along a route as a current geographic location;
repeatedly obtaining, by the at least one processor, an indication of an orientation provided by an attitude sensor;
during the time period, when the current geographic location along the route is determined to be in proximity to but not within a predicted geographic location, receiving, by the at least one processor, a plurality of image tiles of a panoramic image corresponding to the predicted geographic location and caching the received image tiles;

decompressing, by the at least one processor, the cached image tiles, wherein said decompressing is started in response to the current location changing in a direction of the predicted geographic location; and in response to the indication of the current geographic location is within the predicted geographic location, rendering, by the at least one processor, a map image and the panoramic image to display a portion of the panoramic image according to the indication of the orientation provided by the attitude sensor and an aspect of the map image according to the current geographic location, wherein the panoramic image is rendered from the decompressed image tiles.

20. The method according to claim 19, wherein the predicted geographic location is determined based upon user input.

21. The method according to claim 19, wherein the predicted geographic location is determined based upon availability of panoramic imagery for the predicted geographic location and proximity of the predicted geographic location to the current geographic location.

22. A non-transitory computer-readable storage medium having instructions stored thereon, which when executed by a processor of a computer of a handheld electronic device including a memory, a display device and an attitude sensor configured to detect an orientation of the handheld display device, causes the computer to perform operations comprising:

receiving, at each of a plurality of times during a time period, an indication of a respectively different geographic location along a route as a current geographic location;

repeatedly obtaining an indication of an orientation provided by an attitude sensor;

during the time period, when the current geographic location along the route is determined to be in proximity to but not within a predicted geographic location, receiving a plurality of image tiles of a panoramic image corresponding to the predicted geographic location and caching the received image tiles;

decompressing the cached image tiles, wherein said decompressing is started in response to the current location changing in a direction of the predicted geographic location; and in response to the indication of the current geographic location is within the predicted geographic location, rendering a map image and the panoramic image to display a portion of the panoramic image according to the indication of the orientation provided by the attitude sensor and an aspect of the map image according to the current geographic location, wherein the panoramic image is rendered from the decompressed image tiles.

* * * * *